United States Patent [19]

Hohnstein

[11] Patent Number: 5,520,591
[45] Date of Patent: May 28, 1996

[54] METHOD OF CONVERTING A THREE-SPEED TRANSMISSION TO A TWO-SPEED TRANSMISSION

[75] Inventor: Michael J. Hohnstein, Germantown, Wis.

[73] Assignee: Automatic Transmission Design, Germantown, Wis.

[21] Appl. No.: 367,060

[22] Filed: Dec. 30, 1994

[51] Int. Cl.$^6$ .............. F16D 1/00; F16H 3/44; B23P 21/00

[52] U.S. Cl. .......... 475/297; 475/269; 192/70.13; 192/DIG. 1; 29/401.1

[58] Field of Search .......... 192/70.13, DIG. 1; 475/269, 296, 297; 29/401.1

[56] References Cited

U.S. PATENT DOCUMENTS

| | | | |
|---|---|---|---|
| 2,518,824 | 8/1950 | Simpson | 74/763 |
| 2,806,388 | 9/1957 | Simpson | 74/759 |
| 2,856,794 | 10/1958 | Simpson | 74/763 |
| 2,856,795 | 10/1958 | Simpson | 74/763 |
| 2,865,230 | 12/1958 | Simpson | 74/759 |
| 2,873,624 | 2/1959 | Simpson | 74/759 |
| 2,873,625 | 2/1959 | Simpson | 74/763 |
| 3,217,563 | 11/1965 | Simpson | 74/688 |
| 3,319,491 | 5/1967 | Simpson | 74/740 |
| 3,757,600 | 9/1973 | Bieber | 74/473 |
| 4,028,959 | 6/1977 | Long | 74/473 |
| 4,073,204 | 2/1978 | Dick | 74/866 |
| 4,248,106 | 2/1981 | Iwanaga et al. | 74/868 |
| 4,532,821 | 8/1985 | Hager | 74/370 |
| 4,602,519 | 8/1986 | Atkins et al. | 74/375 |
| 4,967,884 | 11/1990 | Norcia | 192/13 |

OTHER PUBLICATIONS

Transmission Technology Corporation, "88/89 Automatic Transmission Parts—Catalog No. AT89" (13 pages).

*Primary Examiner*—Charles A. Marmor
*Assistant Examiner*—Nathan O. Jensen
*Attorney, Agent, or Firm*—Nilles & Nilles

[57] ABSTRACT

A method of converting a three-speed transmission to a two-speed transmission comprises the step of replacing a plurality of steel drive discs and a plurality of friction driven discs of a multiple disc clutch with a clutch bypass. Each of the replaced plurality of steel drive discs have teeth on an outer perimeter. Similarly, each of the replaced plurality of friction driven discs have teeth on an inner perimeter. The clutch bypass, which replaces these discs, has outer teeth on an outer perimeter which match the teeth of the plurality of steel drive discs, and has inner teeth on an inner perimeter which match the teeth of the plurality of friction driven discs. The transmission is convened from a three speed transmission to a two speed transmission by eliminating first speed, so that the transmission upshifts directly from neutral to second speed. First speed is eliminated by making the transmission operate in first speed as if it were in second speed. In particular, the modified transmission operates so that the gear ratios obtained in first and second speed are the same. That gear ratio is also the same as that obtained in second speed in an unmodified transmission. Further, the modified transmission still operates in neutral and third speed in the overall same way that an unmodified transmission operates in neutral and third speed, respectively.

16 Claims, 4 Drawing Sheets

METHOD OF CONVERTING A THREE-SPEED TRANSMISSION TO A TWO-SPEED TRANSMISSION

BACKGROUND OF THE INVENTION

1. Field of Use

This invention relates to automotive transmissions. More specifically, this invention relates to a method of converting a three-speed transmission to a two-speed transmission for use specifically in drag racing.

2. Description of the Related Art

Transmissions are used in automobiles to transmit torque from the engine to the wheels and tires to move the car down the road. To do this efficiently, they use a series of gears to provide several different gear ratios. Automatic transmissions typically come in two speeds or three speeds. In certain situations, for example drag racing, it is preferable to use a two-speed transmission. In some types of drag racing, drivers do not design and build their own transmissions, but rather they use stock production transmissions from ordinary automobiles. The drivers are therefore limited in their choice of a transmission to those two-speed transmissions which have already been designed and built by the major auto manufacturers. In order to increase the number of transmission types from which a driver may choose, it is therefore desirable to have a method of converting a three-speed transmission to a two-speed transmission.

In order to transmit torque from the engine to the wheels, automatic transmissions typically use, among other things, planetary gear systems. Indeed, the Simpson gear set, which is a compound planetary gear system, is used in transmissions made by all of the major auto manufacturers. The Simpson gear set and related improvements have been the subject of many patents, including U.S. Pat. Nos. 2,518,824; 2,806,388; 2,856,794; 2,856,795; 2,865,230; 2,873,624; 2,873,625; 3,217,563; and 3,319,491; all of which are hereby expressly incorporated by reference.

One three speed transmission that utilizes a Simpson planetary gear set is the Turbo Hydramatic 350 (or TH 350) manufactured by General Motors. Due to the many variations in transmission design, the discussion herein will focus on converting a TH 350 into a two-speed transmission. To the extent possible, however, the discussion will be kept general, and it should be understood that the potential applications of the present invention are not limited to the TH 350. A thorough discussion of the structural and operational characteristics of an unmodified TH 350 transmission, and other similar transmissions, is contained in "Automatic Transmissions and Transaxles," Harper Collins Publishers, 2nd ed., 1989; which also is hereby expressly incorporated by reference.

Figures 1A, 1B, 1C:
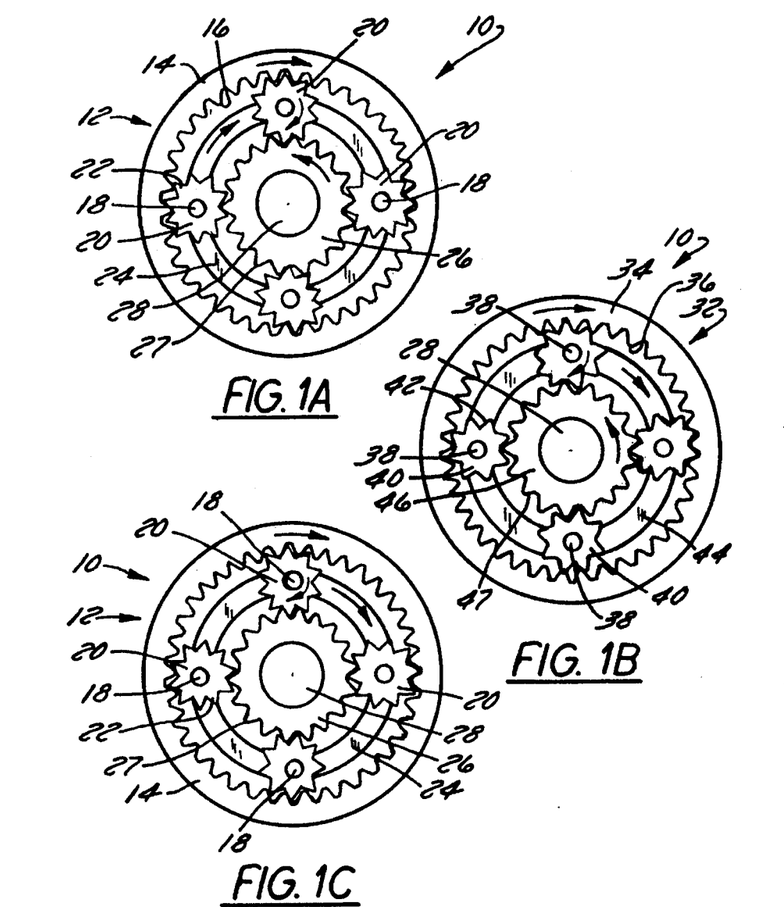
FIG. 1A is a simplified schematic representation of a front gear set of an unmodified transmission in first speed.
FIG. 1B is a simplified schematic representation of a rear gear set of an unmodified transmission in first speed.
FIG. 1C is a representation of a gear set of a modified transmission in first speed and of a gear set of both an unmodified and a modified transmission in second speed.
Figure 1D:
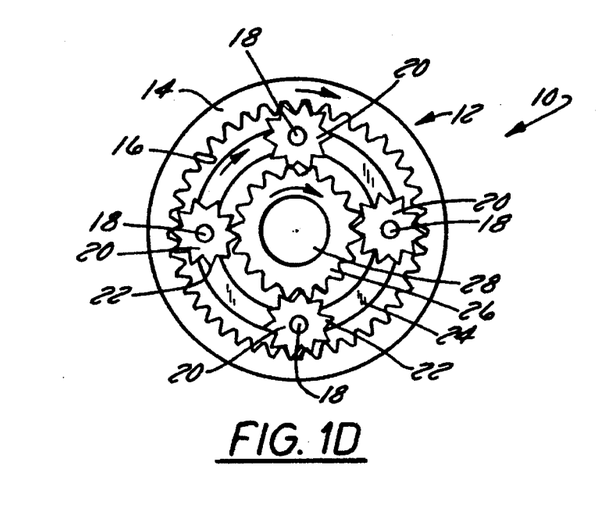
FIG. 1D is a representation of a gear set of both an unmodified and a modified transmission in third speed.

Referring now to FIGS. 1A, 1B, 1C, and 1D a simplified schematic representation of a compound planetary gear set 10 as found in the TH 350 transmission is illustrated. The arrows illustrate the motion of the components of the planetary gear set 10 while the transmission is in first, second, and third speed. More specifically, FIGS. 1A and 1B represent the TH 350 gear set in first speed (or drive low), FIG. 1C represents the TH 350 gear set in second speed (or drive second), and FIG. 1D represents the TH 350 gear set in third speed (or drive high). The discussion herein will be limited to the operation of the transmission in neutral, first speed, second speed, and third speed. The operation of the transmission while it is in reverse, park, manual low, and manual second will not be discussed, since those speeds are not of interest to drag racers.

The compound planetary gear set 10 comprises a front planetary gear set 12 and a rear planetary gear set 32. The front gear set 12 comprises an internal ring gear 14 having teeth 16, a plurality of planet pinion gears 20 having teeth 22, and a sun gear 26 having teeth 27. The planet gears 20 are each mounted to a planet carrier assembly 24 by a plurality of shafts 18. Additionally, the teeth 16 of the ring gear 14 match the teeth 22 of the planet gears 20, which further match the teeth 27 of the sun gear 26.

The rear planetary gear set 32 similarly comprises an internal ring gear 34 having teeth 36, a plurality of planet pinion gears 40 having teeth 42, and a sun gear 46 having teeth 47. Also, the planet gears 40 are each mounted to a planet carrier assembly 44 by a shaft 38. Further, the teeth 36 of the ring gear 34 match the teeth 42 of the planet gears 40, which further match the teeth 47 of the sun gear 46. Finally, the sun gear 26 of the front gear set 12 and the sun gear 46 of the rear gear set 32 have a common shaft 28 which connects the two sun gears 26, 46.

Torque is transmitted from the engine to the wheels by connecting the automobile engine to an input shaft of the transmission (via a torque converter), and by connecting an output shaft of the transmission to the wheels (none of which elements are illustrated). None of the members of the compound planetary gear set are attached directly to an input shaft, however. Rather, a combination of clutches is used to connect the input shaft to the internal ring gear 14 of the front planetary gear system 12. On the other hand, two members of the gear set (the from carrier 24 and the rear ring gear 34) are splined to the output shaft. Hence, one or the other of these two units is always the final driving member of the compound planetary gear set 10.

Referring now also to Table 1, it is seen that the compound planetary gear system 10 can be used to form a transmission having multiple speeds. These different speeds are attained by holding stationary one or more of the ring gears 14, 34; the planet carrier assemblies 24, 44; or the sun gears 26, 46 stationary; while allowing the other members to rotate. By varying which members are held stationary and which are allowed to rotate, different input-output gear ratios are achieved, and a transmission having multiple speeds is obtained. Table 1 illustrates the status of various clutches while the transmission is in first, second, and third speeds. Two types of clutches are used to hold members of the planetary gear set stationary. The first type is a one-way roller clutch which is permanently engaged but which only inhibits one direction of rotation. The second type is a multiple-disc clutch which is selectively engaged and which can control both directions of rotation. Table 1 will be discussed in more detail after the operation of these two types of clutches is explained.

Figure 2A:
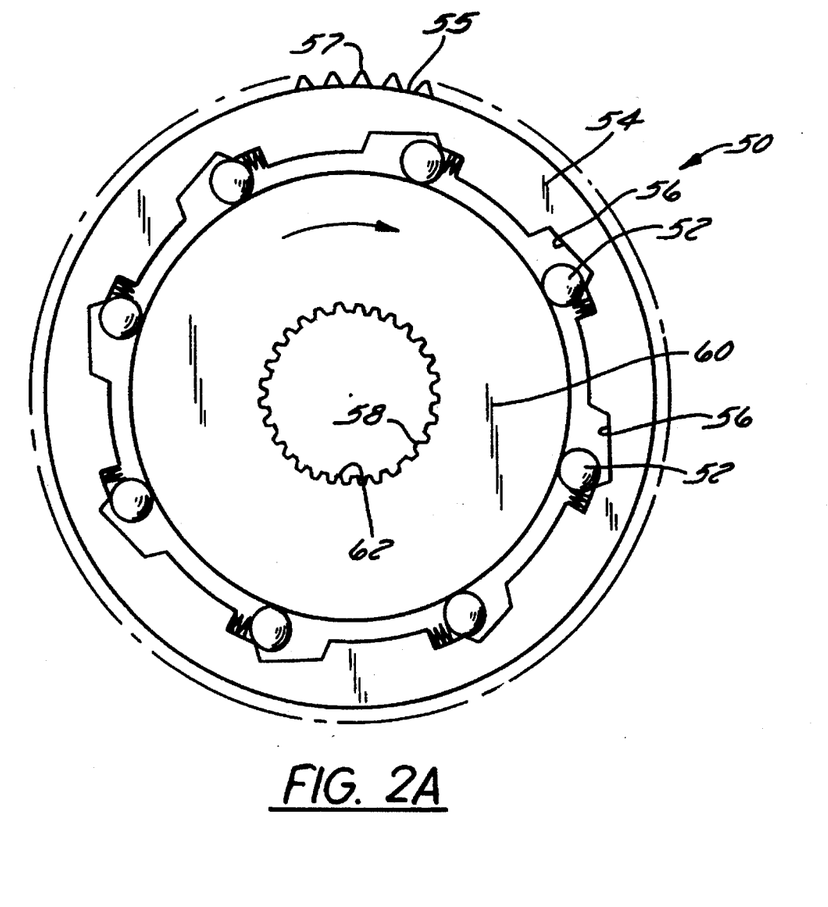
FIG. 2A and 2B are simplified schematic representations of a one-way roller clutch assembly in the unlocked and locked positions, respectively.
Figure 2B:
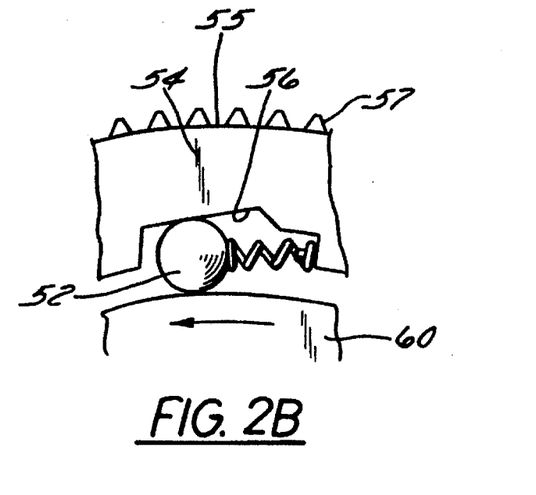

Referring now also to FIGS. 2A, 2B, 3A and 3B, and in particular to FIGS. 2A and 2B, a schematic representation of a simple one-way roller clutch 50 is illustrated. The clutch 50 comprises a cam-cut drum 54 whose inner surface is machined with a series of angled grooves 56 into which rollers 52 are inserted. An outer surface, or outer race 55, of the drum 54 has teeth 57 which are splined to a member which is either permanently held stationary or selectively held stationary. The clutch 50 further comprises a hub 60 which has an inner surface, or inner race 58. Inner race 58 has teeth 62 which are splined to a member which is rotating (or, depending on the direction, which is trying to rotate).

The one-way roller clutch 50 unlocks when the hub 60 rotates clockwise, and locks when the hub 60 rotates counterclockwise. When the hub 60 tries to rotate in the clockwise direction, the rollers 52 are driven rightward and allow the hub 60 to rotate. When the hub 60 tries to rotate in the counterclockwise direction, the rollers 52 are driven leftward and wedge between the drum 54 and the hub 60, causing the clutch 50 to lock. Hence, the one-way roller clutch 50 holds the hub 60 in one direction, but not the other. Although the TH 350 has two different one-way roller clutches, the one that is of particular interest in the present invention is termed an intermediate one-way roller clutch.

Figure 3A:
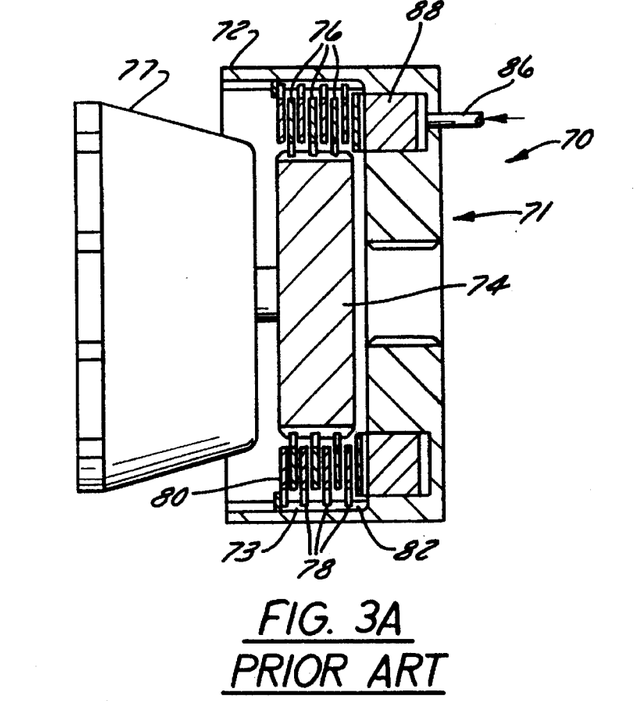
FIG. 3A and 3B are a simplified schematic representations of prior art a transmission section having a one-way roller clutch and a multiple-disc clutch.
Figure 3B:
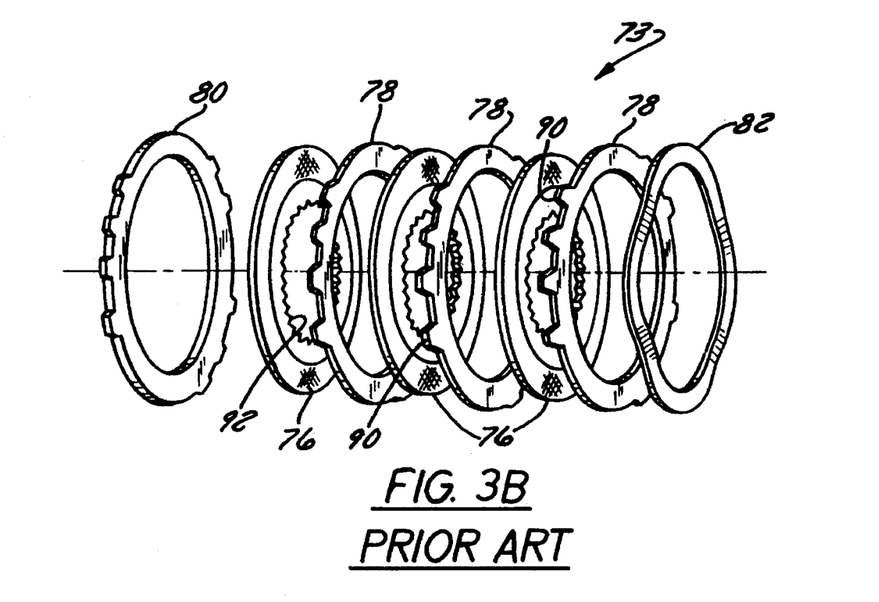

Referring now in particular to FIG. 3A and 3B, a section 70 of a TH 350 having an intermediate one-way roller clutch 74 and an intermediate multiple disk clutch 71 is illustrated. The inner race of the intermediate one-way roller clutch 74 is splined to the front sun gear 26 via a high reverse clutch drum 77. The outer race is splined to the multiple disc clutch 71. The multiple disc clutch 71 is further splined to the transmission case 72, and selectively holds the intermediate one-way roller clutch 74 to the transmission case 72. The multiple disc clutch 71 will now be described in greater detail.

The intermediate multiple disc clutch 71 comprises a plurality of friction driven discs 76 and a plurality of steel drive discs 78. The friction discs 76 have teeth 92 on their inner edges which engage matching teeth on the outside of the intermediate one-way roller clutch 74. The friction discs 76 are alternated between steel discs 78 that have teeth 90 on their outer edges and engage matching teeth machined into the transmission case 72.

When the multiple disc clutch is not engaged, there are spaces between the friction discs 76 and the steel discs 78 and the two sets of discs 76, 78 may move freely with respect to each other. The multiple disc clutch 71 is applied when pressure of hydraulic input 86 is increased, causing a hydraulic annular piston 88 to force the plates 76, 78 together. In particular, two sets of plates 76, 78 are pressed between a pressure plate 80 (which is fixed and does not move relative to the transmission case 72) and a cushion spring 82 (which is acted on by the annular piston 88). The spaces between the friction discs 76 and the steel discs 78 are eliminated, and the two sets of discs 76, 78 grip one another thereby locking together and mechanically connecting the components engaged with their teeth.

From a system perspective, when the intermediate multiple disc clutch 71 is not engaged, and the plates 76, 78 are not locked together, the one-way roller clutch 74 and the front sun gear 26 are free to rotate in either direction. When the multiple disc clutch 71 is engaged, the drum of the roller clutch 74 is held and its rotation is prevented. When the drum of roller clutch 74 is held, the hub of roller clutch 74, and therefore the drum 77 and the front sun gear 26 are prevented from rotating counterclockwise. In short, when the multiple disc clutch 71 is not engaged, the front sun gear 26 is free to rotate in either direction; when the intermediate multiple disc clutch 71 is engaged, counterclockwise rotation of the front sun gear 26 is prevented.

As mentioned above, the multiple disc clutch is engaged when pressure at the hydraulic input 86 is increased. The pressure at the hydraulic input 86 is controlled by a hydraulic shift valve (not illustrated). The shift valve is acted on by throttle pressure and governor pressure which are opposing forces. Throttle pressure varies with engine output torque: throttle pressure is low when engine output torque is low, and is higher when engine output torque is high. For example, throttle pressure will be higher when the engine is accelerating or is operating under a heavy load. Governor pressure varies with speed: governor pressure is low when the output shaft of the transmission is rotating slowly, and is higher when the output shaft of the transmission is rotating quickly. When governor pressure exceeds throttle pressure (and a biasing spring pressure, if any), the shift valve "snaps" and allows mainline pressure to pass. Mainline pressure is high and will cause the multiple disc clutch 71 to engage when fed to the hydraulic input 86 of the multiple disc clutch 71.

In the TH 350, there are two one-way roller clutches. The operation of one of the one-way roller clutches, the intermediate one-way roller clutch, has already been described. The operation of the other one-way roller clutch, the low one-way roller clutch, is essentially the same in that it too prevents rotation in one direction but not the other. The main difference between the two clutches is that they hold different members of the transmission: the low one-way roller clutch is splined to the transmission case 72 and the rear carrier 44, whereas the intermediate one-way roller clutch is splined to the intermediate multiple disc clutch 71 and the front sun gear 26 (via the high reverse clutch drum 77). Since the operation of both roller clutches is essentially the same, the operation of each will hereinafter be described only at the system level.

Further, in the TH 350, there are three multiple disc clutches. Again, the operation of one of the multiple disc clutches, the intermediate multiple disc clutch 71, has already been described. The operation of the two other multiple disc clutches (the forward multiple disc clutch and the high reverse multiple disc clutch) is essentially the same in that they too use a series of friction discs which are alternated with steel drive discs. One main difference between the three multiple disc clutches is that they connect to different members of the transmission: the forward multiple disc clutch connects the input shaft to the front ring gear 14, the intermediate multiple disc clutch 71 connects the transmission case 72 to the intermediate one-way roller clutch 74, and the high-reverse clutch connects the front sun gear 26 to the input shaft. A second main difference between the three multiple disc clutches is that they engage at different throttle pressure/governor pressure combinations. Each of the multiple disc clutches is controlled by a separate shift valve, and although the shift valves are all controlled by the same throttle pressure and governor pressure, they use different biasing springs to vary the throttle pressure/governor pressure combination that will cause the valve to actuate. Since the operation of both roller clutches is otherwise essentially the same, the operation of each will hereinafter be described only at the system level.

Referring back to Table 1, the system level operation of the clutches 71, 74 can be better understood by comparing Table 1 to FIGS. 1A, 1B, 1C and 1D. In neutral, it is seen in Table 1 that none of the multiple disc clutches are engaged and, in particular, the forward multiple disc clutch is not engaged. The forward multiple disc clutch is the clutch that connects the input shaft of the transmission to the front ring gear 14 (which is the input member of the compound planetary gear system 10). Since the forward multiple disc clutch is not engaged, no members of the planetary gear system 10 are driven, and the output shaft of the transmission will not be driven.

In first speed, as illustrated in Table 1, the forward multiple disc clutch is engaged, and therefore the front ring gear 14 (i.e., the input member of the planetary gear set 10) is driven by the transmission input shaft. Note that the forward multiple disc clutch is always engaged in first, second, and third speed; the forward multiple disc clutch must be engaged in order for the front ring gear 14 to be driven. Further, the low one-way roller clutch holds the rear carrier 44 to the transmission case, preventing counterclockwise rotation of the rear carrier 44.

This information corresponds to that which is illustrated in FIGS. 1A and 1B. In FIG. 1A, the front ring gear 14 (which is itself driven by the transmission input shaft) drives the remaining members of the planetary gear set 10 except, as illustrated in FIG. 1B, the rear planet carrier 44 which is the only member held stationary. Hence, torque is transferred from the input shaft to the front ring gear 14, to the from carrier 24, to the front sun gear 26, to the rear sun gear 46, to the rear planet gears 40, to the rear ring gear 34, and to the output shaft. Note that if the rear planet carrier 44 was not held, it would rotate in a counterclockwise direction. However, as described above, the rear planet carrier 44 is held to the transmission case by the low one-way roller clutch and therefore does not rotate.

In second speed, as illustrated in Table 1, the forward multiple disc clutch is engaged and permits the front ring gear to be driven by the transmission input shaft. The intermediate multiple disc clutch 71 is also engaged and prevents counterclockwise rotation of the front sun gear 26. Rotation of the front sun gear 26 is prevented because the sun gear 26 is connected to the intermediate one-way roller clutch 74 (via the high reverse clutch drum), which is connected to the intermediate multiple disc clutch 71, which is splined to the transmission case 72.

This information corresponds to that which is illustrated in FIG. 1C. In FIG. 1C, the rotation of the front planetary gear set 12 while the transmission is in second speed is illustrated. (The rear planetary gear set 32 is not illustrated in second speed since, as described below, it does not rotate in second speed. ) The front ring gear 14 drives the front carrier assembly 24 (which is the output member), while the front sun gear 26 is held. Hence, torque is transferred directly from the input shaft to the front ring gear 14, to the front carrier 24, and to the output shaft. The front sun gear 26 (which is held by the intermediate one-way roller clutch) and the rear planetary gear set 32 do not rotate at all. The members of the rear planetary gear set 32 do not rotate since the front sun gear 26 (which is held) and the rear sun gear 46 share a common shaft 28. Further, since the rear planetary gear set 32 does not rotate, the low one-way roller clutch has no effect.

In third speed, as illustrated in Table 1, the high reverse multiple disc clutch connects the front sun gear 26 to the input shaft. As before, the front ring gear 14 is also connected to the input shaft (because the forward multiple disc clutch is engaged). Hence, since both the front ring gear 14 and the front sun gear 26 are connected to the input shaft, those two gears 14, 26 will rotate at the same speed. Since gears 14, 26 are rotating at the same speed, the planet carrier 24 also rotates at that speed. Since the planet carrier 24 is the output of the planetary gear set 10, it follows that there is a 1:1 gear ratio in third speed; in other words, third speed is a "direct drive" speed.

This information corresponds to that which is illustrated in FIG. 1D. In FIG. 1D, the rotation of the front planetary gear set 12 while the transmission is in second speed is illustrated. (The rear planetary gear set 32 is not illustrated in third speed since, as described, engine torque is not transferred through the rear gear set 32.) The front ring gear 14 and the front sun gear 26 are driven by the input shaft and rotate at the same speed. The gears 14, 26 drive the front carrier 24 which in turn drives the output shaft. Hence, torque is transferred from the input shaft, to the front ring gear 14 and front sun gear 26, to the front carrier 24, and to the output shaft.

The intermediate one-way roller clutch 74, and therefore the intermediate multiple disc clutch 71, have no effect in third speed. This is because the front sun gear 26 rotates clockwise in third speed, and the intermediate one-way roller clutch only prevents counterclockwise rotation. Further, note that the low one-way roller clutch has no effect. This is because the rear sun gear 46 rotates clockwise (since it shares a common shaft 28 with the front sun gear 26), and the low one-way roller clutch only prevents counterclockwise rotation.

As is apparent, transmissions are complex devices. The members of the planetary gear set cooperate in different ways at different speeds. Changing the operation of the transmission at one speed is likely to negatively impact the operation of the transmission at other speeds. Due to this complexity, it has been difficult until now to successfully convert a three speed transmission into a two speed transmission so that all of the remaining speeds function properly. A need therefore exists for a simple method of successfully converting a three speed transmission to a two speed transmission.

SUMMARY OF THE INVENTION

A method of convening a three-speed transmission to a two-speed transmission is presented. A method of the present invention comprises the step of replacing a plurality of steel drive discs and a plurality of friction driven discs of a multiple disc clutch with a clutch bypass. Each of the replaced plurality of steel drive discs have teeth on an outer perimeter. Similarly, each of the replaced plurality of friction driven discs have teeth on an inner perimeter. The clutch bypass, which replaces these discs, has outer teeth on an outer perimeter which match the teeth of the plurality of steel drive discs, and has inner teeth on an inner perimeter which match the teeth of the plurality of friction driven discs.

In accordance with the present invention, a clutch bypass for a transmission having a multiple disc clutch comprises a disc having an inner perimeter and an outer perimeter; outer teeth located about the outer perimeter of the disc, the outer teeth being capable of splining the disc to a transmission case; and inner teeth located about the inner perimeter of the disc, the inner teeth being capable of splining the disc to a rotatable member.

A transmission for an automobile in accordance with the present invention comprises a transmission case; an input shaft connected to an engine of the automobile; an output shaft connected to wheels of the automobile; a planetary gear set connected to the input shaft and the output shaft of the transmission; and a multiple disc clutch. The multiple disc clutch prevents rotation of a rotatable member of the planetary gear set when the multiple disc clutch is engaged, and is connected to the transmission case and to the rotatable member, and finally includes a clutch bypass which permanently engages the multiple disc clutch.

The transmission is convened from a three speed transmission to a two speed transmission by eliminating first speed, so that the transmission upshifts directly from neutral to second speed. From the standpoint of the hydraulic system, the transmission does not actually skip any speeds; the hydraulic system shifts through each of the speeds as in an unmodified transmission. Rather, first speed is eliminated by making the transmission operate in first speed as if it were in second speed. In particular, the modified transmission operates so that the gear ratios obtained in first and second speed are the same. That gear ratio is also the same as that obtained in second speed in an unmodified transmission. Further, the modified transmission still operates in neutral and third speed in the overall same way that an unmodified transmission operates in neutral and third speed, respectively.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Figure 4A:
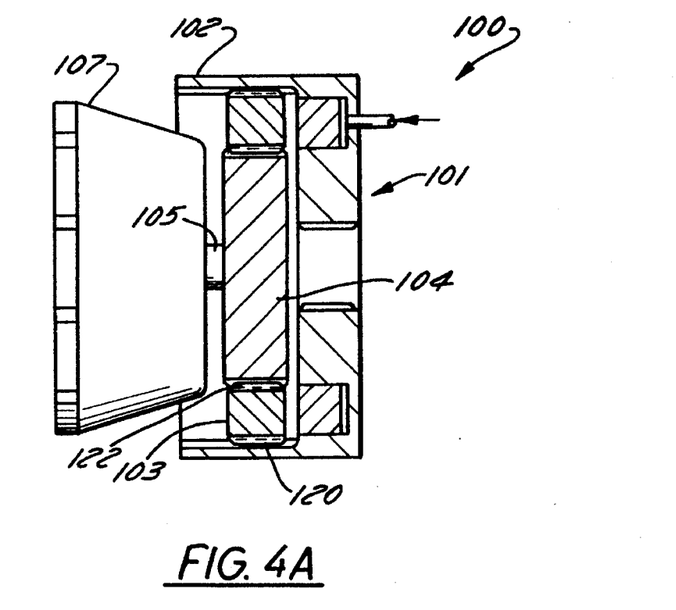
FIG. 4A and 4B illustrate clutch bypass of the present invention and a section of a transmission which has been modified in accordance with the present invention.
Figure 4B:
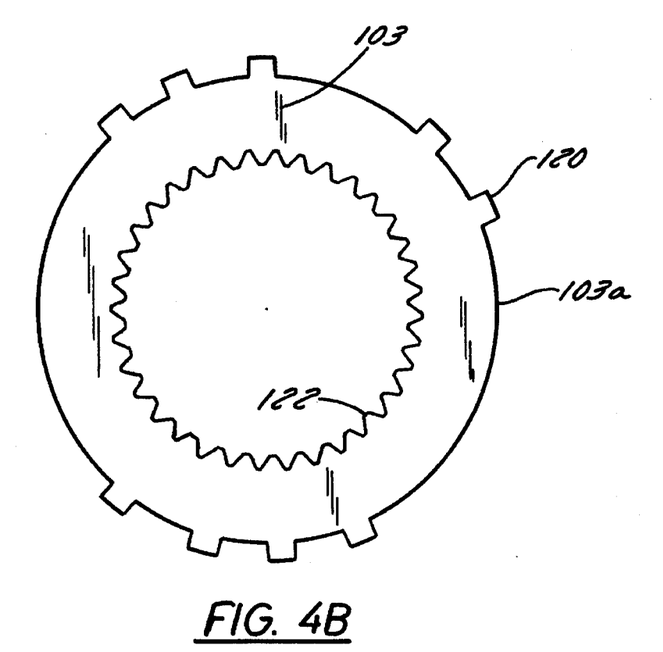

Referring now also to FIGS. 4A and 4B, a clutch bypass 103 of the present invention, and a section 100 of a TH 350 transmission which has been modified in accordance with the present invention, are illustrated. Except as noted, the structure of the transmission section 100 is the same as the structure of the transmission section 70, and therefore the appropriate reference numerals in FIG. 3A have been incremented by 30 to show corresponding parts.

The clutch bypass 103 preferably comprises a single one-piece disc 103a. The clutch bypass 103 corresponds to the clutch disc assembly 73 illustrated in FIG. 3B, meaning that the clutch bypass 103 is substantially the same size and shape as the clutch disc assembly 73 when the members 76, 78, 80, 82 of the clutch disc assembly 73 are pressed together (when the multiple disc clutch 71 is engaged). Hence, the inner surface or inner perimeter of the disc 103a has inner teeth 122 which match the teeth 92 of the friction driven discs 76. In particular, the inner teeth 122 are substantially the same size and shape as the teeth 92. Further, the inner teeth 122 are placed in substantially the same place on the bypass 103 as compared to the placement of the teeth 92 on the discs 76. Similarly, the outer perimeter of the disc 103a has outer teeth 120 which match the teeth 90 of the steel drive discs 78.

The transmission section 100 is the same as the transmission section 70, except that the clutch-disc assembly 73 of the intermediate multiple disc clutch 71 in FIG. 3A has been replaced with a clutch bypass 103 in the multiple disc clutch 101 of FIG. 4A. The modified transmission section 100 comprises a modified intermediate multiple disc clutch 101 having the clutch bypass 103. The outer teeth 120 of the clutch bypass are splined to a transmission case 102. The inner teeth 122 of the clutch bypass are splined to the outer race of a rotatable member, and in particular to the outer race of a one-way intermediate roller clutch 104. The inner race of the intermediate one-way roller clutch 104 is splined to a hub 105 of a high-reverse clutch drum 107, which is further splined to the front sun gear 26 of the planetary gear set 10.

Unlike the clutch disc assembly 73, the bypass 103 does not have a "non-engaged" state wherein the inner teeth 122 rotate but the outer teeth 120 do not rotate. The bypass 103 is permanently splined to both the transmission case 102 and the intermediate one-way roller clutch 104. As a result, since the outer teeth 120 never rotate (i.e., because they are splined to the transmission case 102), the inner teeth 122 will accordingly never rotate. The intermediate multiple disc clutch 101 is therefore permanently engaged and permanently connects the intermediate one-way roller clutch 104 to the transmission case 102. The intermediate multiple disc clutch 101 is therefore bypassed, since it no longer functions to selectively link the intermediate one-way roller clutch 104 to the transmission case 102 (i.e., to link them in some instances but not others).

As illustrated in Table 2, the basic effect of bypassing the intermediate multiple disc clutch is that the front sun gear 26 is permanently prevented from rotating in a counterclockwise direction. Further, since (1) the front sun gear 26 is permanently prevented from rotating in a counterclockwise direction, since (2) the front sun gear 26 is permanently connected to the rear sun gear 46 by the shaft 28, and since (3) the rear sun gear 46 is the input member of the rear planetary gear set 32, the entire rear planetary gear set 32 is permanently prevented from rotating in a counterclockwise direction.

Permanently engaging the intermediate multiple disc clutch 101 converts a three speed transmission into a two speed transmission. Furthermore, the transmission is still operative in the remaining two speeds in spite of this modification. Although the construction of the clutch bypass 103 of the present invention is relatively simple, the operation of the bypass 103 in the modified transmission section 100 is significantly more complicated.

The transmission is convened from a three speed transmission to a two speed transmission by eliminating first speed, so that the transmission upshifts directly from neutral to second speed. From the standpoint of the hydraulic system, the transmission does not actually skip any speeds; the hydraulic system shifts through each of the speeds as in an unmodified transmission. Rather, first speed is eliminated by making the transmission operate in first speed as if it were in second speed. In particular, the modified transmission operates so that the gear ratios obtained in first and second speed are the same. That gear ratio is also the same as that obtained in second speed in an unmodified transmission. Further, the modified transmission still operates in neutral and third speed in the overall same way that an unmodified transmission operates in neutral and third speed, respectively.

As discussed below, the operation of the modified transmission in neutral, first, second, and third speeds is determined by the operation of the five clutches (and the hydraulic system). Hence, the clutches have the same effect in both first and second speed as they do in second speed in an unmodified transmission. Further, they have essentially the same effect in neutral and third speed in the modified transmission as they have in neutral and third speed, respectively, in an unmodified transmission. Although one difference exists in neutral, this difference does not affect the overall operation of the transmission in neutral. The modified transmission is most easily understood when studied on a clutch-by-clutch basis. Two types of clutches are of concern: the multiple disc clutches and the one-way roller clutches.

In regards to the multiple disc clutches, and in particular the forward multiple disc clutch and the high reverse multiple disc clutch, they are controlled by the shift valves which are part of the hydraulic control system. As already described, each of the multiple disc clutches is controlled by a separate shift valve. The shift valves are controlled by the governor pressure and the opposing throttle pressure. It is important to note, therefore, that once a valve opens, it will remain open as the speed setting increases from first speed, to second speed, and then to third speed.

In Table 1, it is seen that the forward multiple disc clutch engages in first speed, then remains engaged in second and third speed. Hence, the forward multiple disc clutch is always engaged in first, second, and third speeds; and therefore operates the same in both first and second speeds. Also, the high-reverse multiple disc clutch does not engage until third speed. Hence the high reverse multiple disc clutch is never engaged in either first speed or second speed; and therefore similarly operates the same in both first and second speeds. Because both the forward multiple disc clutch and the high reverse multiple disc clutch each operate the same in first and second speeds in an unmodified transmission, no modification is necessary to make them operate the same in first speed as compared to second speed in the modified transmission. The forward multiple disc clutch and the high-reverse multiple disc clutch operate exactly the same in both the modified an unmodified transmissions.

In regards to the intermediate multiple disc clutch 101, it is seen in Table 1 that in an unmodified transmission this clutch is not engaged in first speed but then engages when the transmission upshifts to second speed. Hence, the intermediate multiple disc 101 clutch is the only multiple disc clutch whose operation needs to be modified, and this modification is achieved through the use of clutch bypass 103. In the modified transmission, as seen in Table 2, the intermediate multiple disc clutch 101 is permanently engaged, and is therefore engaged in first speed as well as in second speed.

Note that the one clutch operation difference that occurs between the modified transmission and the unmodified transmission occurs in neutral. In particular, the intermediate multiple disc clutch in the modified transmission is engaged in neutral, whereas in an unmodified transmission it is not engaged in neutral. As discussed below, this difference does not effect the overall operation of the transmission in neutral.

In regards to the operation of the one-way roller clutches, their operation is determined by the operation of the multiple disc clutches and the resulting rotation of the members of the planetary gear set 10. The operation of the one-way roller clutches, and the operation of the modified transmission in general, can be better understood by comparing Table 2 with Table 1 and with FIG. 1B, 1C, and 1D.

Table 2 illustrates the status of the five clutches of interest in a modified TH 350 transmission while the transmission is in neutral, first, second, and third speeds. The portions of Table 2 which are italicized represent differences of Table 2 as compared to Table 1.

In neutral, it is seen in Table 2 that none of the multiple disc clutches are engaged and, in particular, the forward multiple disc clutch is not engaged. Since the forward multiple disc clutch is not engaged, no members of the planetary gear set 10 are driven. In these respects, the operation of the transmission is the same as before in neutral.

The main difference between the operation of an unmodified transmission in neutral and the operation of a modified transmission in neutral is the fact that the intermediate multiple disc clutch 101 is engaged. This, however, does not affect the overall operation of the modified transmission in neutral because the forward multiple disc clutch is not engaged. As described, engagement of the intermediate multiple disc clutch 101 prevents counterclockwise rotation of the front sun gear 26. However, because none of the members of the planetary gear set 10 are rotating, and in particular the front sun gear 26 is not rotating, there is no counterclockwise rotation of the front sun gear 26 for the intermediate one-way roller clutch 104 to prevent. As a result, the overall operation of the transmission in neutral is not affected.

In first speed, as illustrated in Table 2, the forward multiple disc clutch is engaged and permits the front ring gear 14 to be driven by the transmission input shaft. Since the intermediate multiple disc clutch 101 is permanently engaged in the modified transmission section 100, it permanently prevents counterclockwise rotation of the front sun gear 26.

This information corresponds to that which is illustrated in FIG. 1C. In FIG. 1C, the rotation of the front planetary gear set 12 while the transmission is in second speed is illustrated. (The rear planetary gear set 32 is not illustrated in second speed since it does not rotate in second speed.) The front ring gear 14 drives the front carrier assembly 24 (which is the output member), while the front sun gear 26 is held. Hence, torque is transferred directly from the input shaft to the front ring gear 14, to the front carrier 24, and to the output shaft. The front sun gear 26 (which is held by the intermediate one-way roller clutch) and the rear planetary gear set 32 do not rotate at all since the intermediate multiple disc clutch 101 is engaged. Further, since the rear planetary gear set 32 does not rotate, the low one-way roller clutch has no effect.

In first speed, operation of the two transmissions is similar only in that the forward multiple disc clutch is engaged in both cases and the high reverse multiple disc clutch is not engaged in both cases. The reasons for these two similarities have already been described.

The operation of the modified transmission is in first speed is quite different as compared to that of the unmodified transmission. The operation of the modified transmission is different in first speed in that (1) the intermediate multiple disc clutch 101 is engaged, (2) the intermediate one-way roller clutch 104 acts to prevent counterclockwise rotation of the front sun gear 26, and (3) the low one-way roller clutch has no effect.

Regarding the first difference, intermediate multiple disc clutch is engaged because, as already discussed, of the use of the clutch bypass 103 of the present invention. Regarding the second difference, since the intermediate multiple disc clutch 101 is engaged, the intermediate one-way roller clutch 104 is held to the transmission case 102 and acts to prevent counterclockwise rotation of the front sun gear 26. Again, note that in first speed in an unmodified transmission, the intermediate multiple disc clutch 101 is not engaged, and therefore the intermediate one-way roller clutch 104 is not held to the transmission case and therefore cannot act to prevent counterclockwise rotation of the front sun gear 26. With the intermediate multiple disc clutch 101 permanently engaged, the intermediate one-way roller clutch 104 always prevents counterclockwise rotation of the front sun gear 26 even in first speed.

Regarding the third difference, in an unmodified transmission in first speed, wherein rotation of the from sun gear 26 is not prevented, the low one-way roller clutch prevents counterclockwise rotation of the rear carrier 44. However, with rotation of the front sun gear 26 prevented by the intermediate one-way roller clutch 104, the rear planetary gear set 32 does not rotate. Hence, the low one-way roller clutch has no effect. It is therefore seen that, in response to the engagement of the intermediate multiple disc clutch 101, the first speed operation of the roller clutches change so as to conform to second speed operation. The net effect is that, with the intermediate multiple disc clutch 101 engaged in first speed, the modified transmission operates as if it were in second speed.

In second speed, the modified transmission operates in exactly the same manner as it operates in first speed, and further, it acts in exactly same manner same as an unmodified transmission operates in second speed. Since the operation of the modified transmission in first speed has already been described, operation of the modified transmission in second speed will not be described, except to say that the operation is the same in the two speeds.

In third speed, the operation of the modified transmission is exactly the same as the operation of the unmodified transmission. In particular, as illustrated in Table 2, the high reverse multiple disc clutch connects the front sun gear 26 to the input shaft, and the forward multiple disc clutch connects the front ring gear 14 the input shaft. Hence, since both the front ring gear 14 and the front sun gear 26 are connected to the input shaft, those two gears 14, 26 will rotate at the same speed. Since gears 14, 26 are rotating at the same speed, the planet carrier 24 also rotates at that speed. Since the planet carrier 24 is the output of the planetary gear set 10, it follows that the input shaft directly drives the output shaft in third speed.

This information corresponds to that which is illustrated in FIG. 1D. In FIG. 1D, the rotation of the front planetary gear set 12 while the transmission is in third speed is illustrated. (The rear planetary gear set 32 is not illustrated in third speed since, as described, engine torque is not transferred through the rear gear set 32.) The front ring gear 14 and the front sun gear 26 are driven by the input shaft and rotate at the same speed. The gears 14, 26 drive the front carrier 24 which in turn drives the output shaft. Hence, torque is transferred from the input shaft, to the front ring gear 14 and front sun gear 26, to the front carrier 24, and to the output shaft.

The intermediate one-way roller clutch 104, and therefore the intermediate multiple disc clutch 101, have no effect in third speed. This is because the front sun gear 26 rotates clockwise in third speed, and the intermediate one-way roller clutch only prevents counterclockwise rotation. Further, note that the low one-way roller clutch has no effect, since the rear sun gear 46 rotates clockwise, and the low one-way roller clutch only prevents counterclockwise rotation.

Finally, although the above disclosure describes the inventor's preferred embodiment of the present invention, it is recognized that the present invention may be constructed in other configurations which satisfy the primary objective of providing a clutch bypass for effectively converting a three-speed transmission to a two-speed transmission. For example, it may be possible to modify the transmission by hydraulically interconnecting the forward and intermediate hydraulic circuits to place the shift valve in the intermediate position, or by physically modifying the valve body to effect the same result. Such modifications are intended to be within the spirit and scope of the present invention. Furthermore, it is anticipated that the present invention will be normally used in conjunction with a modified valve body and an internal hydraulic transbrake of the type used in drag racing.

Therefore, specific details of the invention disclosed above are not to be interpreted as limiting, but merely as a basis for the claims and for teaching one skilled in the art to variously practice and construct the present invention in any appropriate manner. Changes may be made in details of construction of the invention without departing from the spirit of the invention, especially as defined in the following claims.

TABLE 1

PRIOR ART

| GEAR RANGES | CLUTCHES | | | | |
|---|---|---|---|---|---|
| | Low 1-Way | Intermediate 1-Way | Forward Multiple Disc | Intermediate Multiple Disc | High-reverse Multiple Disc |
| Neutral | No effect (Since forward multiple disc clutch not engaged) | No effect (Since forward multiple disc clutch not engaged) | (Not engaged) | (Not engaged) | (Not engaged) |
| First speed | Holds rear carrier to transmission case (Preventing CCW rotation of rear carrier) | No effect (Since intermediate multiple disc clutch is not engaged) | Connects front ring gear to input shaft | (Not engaged) | (Not engaged) |
| Second speed | No effect (Allows CW rotation of rear carrier) | Connects int. mult. disc clutch to high reverse drum, which is connected to front sun gear | Connects front ring gear to input shaft | Connects transmission case to intermediate 1-way clutch | (Not engaged) |

TABLE 1-continued

PRIOR ART

| | | | CLUTCHES | | |
|---|---|---|---|---|---|
| GEAR RANGES | Low 1-Way | Intermediate 1-Way | Forward Multiple Disc | Intermediate Multiple Disc | High-reverse Multiple Disc |
| Third speed | No effect (Allows CW rotation of rear carrier) | (Prevents CCW rotation of front sun gear) No effect (Allows CW rotation of front sun gear) | Connects front ring gear to input shaft | Connects transmission case to intermediate 1-way clutch | Connects front sun gear to input shaft |

TABLE 2

| | | | CLUTCHES | | |
|---|---|---|---|---|---|
| GEAR RANGES | Low 1-Way | Intermediate 1-Way | Forward Multiple Disc | Intermediate Multiple Disc | High-reverse Multiple Disc |
| Neutral | No effect (Since forward multiple disc clutch not engaged) | No effect (Since forward multiple disc clutch not engaged) | (Not engaged) | (No effect since forward multiple disc clutch not engaged) | (Not engaged) |
| First speed | No effect (Allows CW rotation of rear carrier) | Connects int. mult. disc clutch to high reverse drum, which is connected to front sun gear (Prevents CCW rotation of front sun gear) | Connects front ring gear to input shaft | Connects transmission case to intermediate 1-way clutch | (Not engaged) |
| Second speed | No effect (Allows CW rotation of rear carrier) | Connects int. mult. disc clutch to high reverse drum, which is connected to front sun gear (Prevents CCW rotation of front sun gear) | Connects front ring gear to input shaft | Connects transmission case to intermediate 1-way clutch | (Not engaged) |
| Third speed | No effect (Allows CW rotation of rear carrier) | No effect (Allows CW rotation of front sun gear) | Connects front ring gear to input shaft | Connects transmission case to intermediate 1-way clutch | Connects front sun gear to input shaft |

I claim as my invention:

1. A method of modifying a transmission having a transmission case, said method comprising the step of replacing a plurality of steel drive discs and a plurality of friction driven discs of a multiple disc clutch with a clutch bypass,
   wherein each of said plurality of steel drive discs have teeth on an outer perimeter;
   wherein each of said plurality of friction driven discs have teeth on an inner perimeter; and
   wherein said clutch bypass has outer teeth on an outer perimeter matching said teeth of said plurality of steel drive discs, and has inner teeth on an inner perimeter matching said teeth of said plurality of friction driven discs.

2. The method as in claim 1, wherein said replacing step causes the transmission to have the same input to output gear ratio in two speeds.

3. The method as in claim 2, wherein said replacing step causes the transmission to have the same input to output gear ratio in first and second speed.

4. The method as in claim 1, wherein said replacing step prevents a front sun gear of a planetary gear set from rotating counterclockwise.

5. The method as in claim 1, wherein said outer teeth are splined to a transmission case, and wherein said inner teeth are splined to a one-way roller clutch.

6. The method as in claim 1, wherein said clutch bypass consists of a one-piece disc having said inner teeth and said outer teeth formed thereon.

7. The method as in claim 1, wherein said replacing step prevents the rotation of a rear planetary gear set within said transmission.

8. The method as in claim 1, wherein said clutch bypass further replaces a pressure plate and a cushion spring.

9. A transmission for an automobile, said transmission comprising:
   a transmission case;
   an input shaft connected to an engine of said automobile;
   an output shaft connected to wheels of said automobile;
   a planetary gear set connected to said input shaft and said output shaft of said transmission; and
   a clutch bypass which replaces a multiple disc clutch connected to the transmission case and a rotatable member of the planetary gear set, the clutch bypass permanently preventing rotation of the rotatable member.

10. A transmission as in claim 9, wherein said clutch bypass includes:

a disc having an inner perimeter and an outer perimeter;

outer teeth located about said outer perimeter of said disc, said outer teeth being capable of splining said disc to said transmission case; and inner teeth located about said inner perimeter of said disc, said inner teeth being capable of splining said disc to said rotatable member.

11. The transmission as in claim 10, wherein said rotatable member is a one-way roller clutch.

12. The transmission as in claim 10, wherein said transmission has the same input to output gear ratio in two speeds.

13. The transmission as in claim 10, wherein said transmission has the same input to output gear ratio in first speed that it has in second speed.

14. A clutch bypass for a transmission having a multiple disc clutch, said bypass comprising:

a disc having an inner perimeter and an outer perimeter;

outer teeth located about said outer perimeter of said disc, said outer teeth being capable of splining said disc to a transmission case; and inner teeth located about said inner perimeter of said disc, said inner teeth being capable of splining said disc to a rotatable member.

15. A clutch bypass as in claim 14, wherein said rotatable member is a one-way roller clutch.

16. A clutch bypass as in claim 14, wherein said one-way roller clutch prevents counterclockwise rotation of a front sun gear of said transmission.

\* \* \* \* \*